Figure 1:
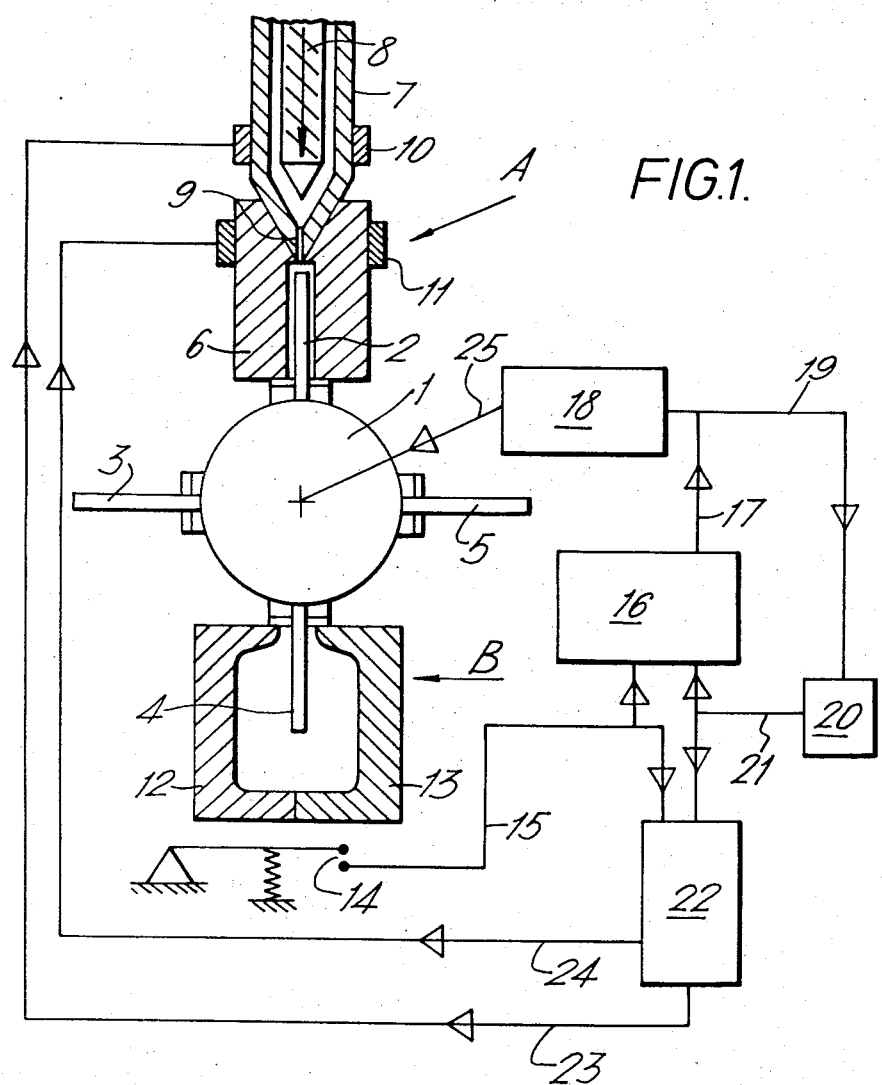

United States Patent [19]
Lachner et al.

[11] 3,865,913
[45] Feb. 11, 1975

[54] MULTISTATION PROCESS FOR MANUFACTURING HOLLOW BODIES

[75] Inventors: Otto Lachner, Kempten; Ludwig Beyerlein, Lenzfried; Klaus Spelthahn, Kempten, all of Germany

[73] Assignee: Lever Brothers Company, New York, N.Y.

[22] Filed: Dec. 12, 1973

[21] Appl. No.: 424,140

[30] Foreign Application Priority Data
Dec. 14, 1972  Germany............................ 2261225

[52] U.S. Cl...................... 264/40, 264/97, 425/143, 425/150, 425/156, 425/DIG. 231
[51] Int. Cl............................................. B29c 17/07
[58] Field of Search.......... 264/40, 94, 97; 425/143, 425/150, 155, 156, DIG. 231, 242 B, 387 B

[56] References Cited
UNITED STATES PATENTS
| | | | |
|---|---|---|---|
| 3,217,357 | 11/1965 | Martin, Jr....................... | 425/156 X |
| 3,784,657 | 1/1974 | Hutchinson et al................... | 264/40 |
| 3,792,134 | 2/1974 | Paulson................................. | 264/40 |

FOREIGN PATENTS OR APPLICATIONS
| | | | |
|---|---|---|---|
| 1,016,455 | 1/1966 | Great Britain........................ | 264/40 |

*Primary Examiner*—Jan H. Silbaugh
*Attorney, Agent, or Firm*—Lever Brothers Company

[57] ABSTRACT

In a multi-station process for injection moulding preforms on a mandrel at one station, the mandrel carrying the preforms to a blow moulding station where they are blow moulded to the final shape, a plurality of mandrels are provided so that a mandrel is positioned at each station during each working cycle. The beginning and end of each working cycle is sensed and the actual elapsed time compared with a predetermined constant time, the next working cycle being begun at the end of either the elapsed time or the constant time whichever is the longer.

4 Claims, 2 Drawing Figures

MULTISTATION PROCESS FOR MANUFACTURING HOLLOW BODIES

The present invention relates to a multi-station process for manufacturing hollow bodies by the steps of injection moulding a preform of thermoplastic material and blow moulding the preform to the desired final shape.

Preforms, particularly of thermoplastic material, for instance PVC, are required and used for various purposes such as the production of bottles. These preforms are commonly produced by the conventional injection moulding methods. This means that the thermoplastic material is injected from an injection moulding apparatus through an injection nozzle into a preliminary mould of the same shape as that desired for the preform. The preform is then further processed by blow moulding to form the bottle or similar hollow body.

Such a process is commonly carried out at a number of stations in a single apparatus, one step being carried out at each station simultaneously in one working cycle, the preform being formed on a mandrel and carried by the mandrel to each subsequent station.

Each of the process steps can comprise more than one operation, e.g. the injection moulding step comprises the operations of injecting the plasticised material into the injection mould, and a cooling time in which the injected material sets whilst the blow moulding step comprises blowing the preform to contact the walls of the blow mould, a cooling time and an ejection operation after the blow mould has opened. Each process step also necessarily includes moving the mandrel from station to station and opening and closing of the mould halves.

Depending upon several factors, one of the process steps will require a longer period of time than any of the other process steps. It has previously been proposed to select the longest process step as the basis for sequential control of the process, i.e. to arrange that the end of the longest process step determines when the next working cycle begins. This method of control leads however to variations in the time of the working cycle since the process step on which the control is based itself comprises a number of operations sequentially controlled, i.e. one operation starting only when the previous operation is complete. Even the time for opening and closing the mould halves can vary.

Thus the previously proposed sequential control of the working cycles does not give an even running process, the working cycles constantly varying. Constant cycle times are desirable, not only because a further treatment or processing stage may be connected downstream of the production process for example the packing or filling of the blow moulded hollow articles, but also, and much more important, because of the very considerable importance of the preforms having a temperature profile within a desired narrow range when being blow moulded. Any variation in the length of time of a working cycle will affect temperature profile of the preforms and in the case of a multiple station process each preform may be affected by variations in the length of more than one working cycle. In order to ensure that a temperature profile is obtained, lying within that narrow range found to be satisfactory for blow moulding the preforms, will constantly recur in the course of continuous operation of the process, the process must be controlled in such constant time that it produces temperature profiles within the acceptable range.

Straightforward constant time control, the obvious solution, is not feasible however as during the process the time between discharge of consecutive end products, i.e. the blow moulded hollow article, can in relatively few individual cases be considerably longer than the average. Adjusting the time control to these few individual cases would have a very adverse effect on the process as regards the output of finished products. Setting the constant time control cycle times in such a way that they are shorter than the duration of the few individual cases would be bound to bring the process to a standstill by causing a breakdown in the apparatus carrying out the process when a blow moulded hollow article which has not been ejected is carried by a mandrel to the injection moulding station.

It is therefore an object of the invention to provide a process in which the working cycles are almost constant in time, i.e. providing preforms for blow moulding having temperature profiles within the desired range, whilst ensuring that particular delays in ejecting an end product do not disrupt the process.

According to the present invention there is provided a multi-station process of forming hollow articles of thermoplastic material comprising the steps of injecting a quantity of plasticized material through an injection nozzle into an injection mould to form a preform and blow moulding the preform to the desired hollow shape in a blow mould, each of the steps being carried out during one working cycle, sensing the beginning of a working cycle, sensing the end of a working cycle as determined by the ejection of a blow moulded article, comparing the elapsed time for a working cycle with a pre-determined constant cycle time, and beginning a subsequent working cycle at the end of the elapsed time or at the end of the pre-determined cycle time, whichever is the longer.

The obvious advantage of this process is clear if it is realised that using sequential control and pre-determined constant time cycle control in parallel enables, before a new working cycle is started, an estimated/actual comparison to be made in respect of the previous working cycle time. This means that a comparison is made between the constant pre-determined time and the actual working cycle time, the result of the comparison leading, in the case of the actual time being shorter than the pre-determined time, to working cycles the length of the pre-determined time and, in the case of the actual time being longer than the pre-determined time, to working cycles the length of the actual time. Since as a rule the pre-determined time is set in such a logical way that within this time almost all the fluctuations normally occurring in the times of the operations which together make up the longest working cycle are taken into account the process operates in normal conditions in working cycles having a length equal to the pre-determined time, i.e. by constant time control. On the other hand however exceptional delays in ejecting a hollow article beyond the predetermined time are allowed for by the sequence control so that overall the process cannot be disrupted. Fixing the ratio of the pre-determined time to all possible actual times is a question of optimisation between obtaining an economically acceptable discharge rate of finished articles and the required accuracy of the temperature profile of the preform.

In order to ensure that the injection moulding operation is as smooth running as possible, that there is thermal closure of the injection nozzle after each individual injection, that the thermal closure plug can be removed at the beginning of each individual injection by being pressed into the injection mould, that the plasticised material does not scorch during injection or that the material is not cooled too much, the temperature of the injection nozzle and that part of the injection mould contacted by the injection nozzle is regulated, heat being conducted into the injection nozzle and out of the injection mould.

Temperature regulation is influenced to a large extent by the amount of frictional heat created when the thermoplastic material is forced through the injection nozzle. Also, as regards the frictional heat, it should also be remembered that the amount of heat developed depends on the value of the frictional coefficient which depends however on temperature and is thus dependent on the dissipation of the frictional heat occurring. For example, the frictional coefficient of PVC increases within the relevant temperature range whereas with polyolefins the situation is quite the reverse so that if frictional heat is not completely dissipated the temperature, and thus the coefficient of friction, increases which again means that the amount of frictional heat occurring increases.

The amount of frictional heat developed in normal operation of the process is accommodated by the heating of the injection nozzle and cooling of the adjacent part of the injection mould. The material to be injected through the injection nozzle must not be cooled down too much during pauses between injection operations as this could lead to the thermal sealing plug in the injection nozzle freezing and the nozzle having to be thawed out by full heating for a fairly long time during which the process is interrupted. To avoid this freezing in the injection nozzle the process of the present invention can include sensing when the pre-determined cycle time is exceeded by the elapsed time and applying heat to the injection nozzle. Cooling of the injection mould can also be reduced when the pre-determined cycle time is exceeded by the elapsed time.

The heat applied to the extruder nozzle and the reduction of cooling of the injection mould can be proportional to the difference between the elapsed time and the pre-determined time.

Figure 2:
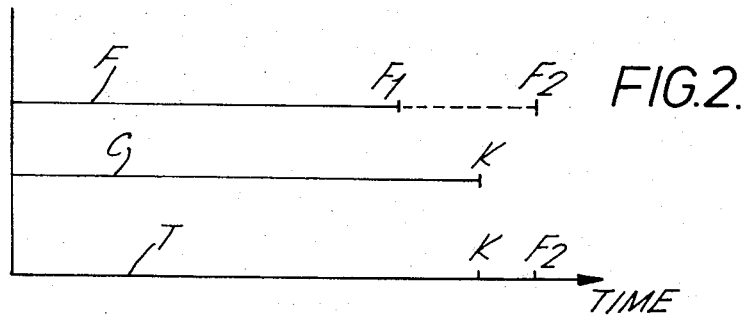

The invention will now be more particularly described with reference to the accompanying diagrammatic drawings in which:

FIG. 1 is a schemmatic drawing of an apparatus for carrying out the invention, and FIG. 2 is a diagram showing a cycle time comparison for sequential control and constant time control.

Referring to FIG. 1 there is shown a rotor 1 on which are mounted four mandrels 2, 3, 4 and 5. Drive means (not shown) are provided for rotating the rotor intermittently through 90° to bring each of the mandrels in turn to an injection moulding station and subsequently to a blow moulding station B. At the injection moulding station A the mandrels are enclosed by an injection mould 6. An extruder 7 having an injection unit 8 is in contact with the injection mould, the extruder having an injection nozzle 9 through which the thermoplastic material is forced into the injection mould.

A heater band 10 is provided around the extruder adjacent to the injection nozzle and a cooling band 11 is provided around the injection mould at that part of the mould adjacent where it is contacted by the extruder. At the blow moulding station B a mandrel is enclosed by a two-part blow mould 12 and 13.

In operation, plasticised material is injected from the extruder through the injection nozzle 9 into the injection mould which has a core formed by one of the mandrels. As shown in FIG. 1 the mandrel 2 is at the injection station A. The injection mould and the extruder are then separated from the rotor leaving the injection moulded preform on the mandrel 2.

The rotor 1 then rotates through 90° to begin another working cycle during which another preform is injection moulded on mandrel 5.

At the end of this working cycle the rotor again rotates through 90° to bring the mandrel 2 to station B. The mould halves 12 and 13 close around the mandrel 2 and the preform is expanded by blowing to the interior shape of the blow mould. When the blow moulded article has cooled to set the mould halves are opened and the finished article is ejected.

During this working cycle a further preform is injection moulded at the station A. During continuous operation a finished article is blown at each working cycle, it taking three working cycles to manufacture each article.

As shown in FIG. 1 there is a contact switch 14 below the blow mould at station B. The contact switch is connected by circuit 15 to an electrical switching device 16 having an output circuit 17 connected to a control device 18 which controls the rotation of the rotor 1 as indicated by circuit 25. The output circuit 17 of the switching device 16 is also connected by circuit 19 to a timer 20, an output circuit 21 from the timer being connected to the switching device 16.

Contact switch 14 and timer 20 are also connected by circuits 15 and 21 to a setting regulator 22 which regulates the power applied to the heater band 10 and cooling band 11 by circuits 23 and 24 respectively.

A working cycle is begun when a signal is passed from the switching device 16 along circuit 17 to the control device 18 whereupon the rotor is rotated to bring the mandrels to the next station. The signal from the switching device 16 is also passed along circuits 17 and 19 to initiate the operation of the timer 20. At the end of a pre-determined period of time the timer 20 sends a signal along circuit 21 to the switching device 16.

As a finished article is ejected from the blow mould it contacts the switch 14 and also sends a signal to the switching device 16. When both signals have been received the switching device 16 sends another signal along circuit 17 to begin the next working cycle.

The switching device 16 makes a comparison between the elapsed time for a working cycle as indicated by the operation of the contact switch 14, and the pre-determined constant time as indicated by the signal along circuit 21 from the timer 20. When the constant time signal is received first it is suppressed whereas when the elapsed time signal is received last the switching device operates to initiate another working cycle. Similarly if the elapsed time signal is received first it is suppressed and a new working cycle is not initiated until the signal is received from the timer 20.

The signals from the contact switch 14 and the timer 20 are also passed to the setting regulator 22. The setting regulator 22 also makes a comparison between the elapsed time and the constant time. When the elapsed time is longer than the constant time, i.e. when the signal from the switch 14 is received after the signal from the timer 20, the setting regulator operates by circuits 23 and 24 to increase the amount of heat supplied by the heating band 10 and decrease the amount of cooling effected by the cooling band 11. Thus when any delay occurs in beginning a new working cycle beyond the predetermined constant time the thermoplastic material in the extruder is prevented from freezing.

Referring now to FIG. 2 there is shown on a timescale the effect of constant time control, elapsed time or sequential control, and the combination of these two methods in controlling the length of time of the working cycles.

On line F is shown the effect of sequential control alone, i.e. a new working cycle is commenced as the preceding cycle ends as indicated by the discharge of a hollow body from the blow mould. As shown in line F the length of time of working cycles is found to vary anywhere between F1 and F2 in normal operating conditions.

On line C is indicated the length of the predetermined constant time K. On line T is shown the effect of combining the constant time control with the sequential control. It will be appreciated that the variation in cycle times is now reduced to the period between K and F2. Whereas with the sequential control alone not all articles were produced satisfactorily because the working cycle times were too short, the value of K can be chosen to be the minimum possible time in which good articles are produced. This also means that the maximum production is obtained from the process.

If the end of a working cycle is indicated by operation of the contact switch 14 is at F1, i.e. shorter than K, then the initiation of the next cycle is delayed until time K so that the preforms at the station A and the intermediate station are subjected to the constant time K at those stations. These preforms therefore arrive at the blowing station B after undergoing substantially the same time at earlier stations and thus at substantially the desired temperatures. On the other hand if the constant time K is exceeded by the elapsed time then the new cycle does not begin until time F2 has elapsed as indicated by operation of the contact switch 14. There will therefore be the possibility that the working cycle times can vary between K and F2 leading in the worst case to a variation in the time of manufacturing one preform and bringing it to the blow moulding station in a three station process to two times the difference between K and F2. As the value of K must be chosen so that even though this variation in time can occur nevertheless the temperature profile of a preform arriving at station B is within the required temperature range, the value of K is therefore optimised between the required accuracy of temperature profiles of the preforms and the maximum production rate.

In certain exceptional instances there can be delays in ejecting a blown article which can be simply due to an article sticking on the mandrel or in the mould, or to a faulty blow. In these exceptional instances the operation of the switch 14 may be delayed for considerably longer time than is indicated by F2, or the mould may have to be cleared and the switch operated manually. Since the setting regulator 22 operates to increase heat supply by heater band 10 and reduce the cooling effect of cooling band 11 as soon as time K is exceeded before a new cycle commences, any delays in the starting of a new working cycle are sensed and the extruder is prevented from freezing.

During the period from K to F2 very little effect on the heat content of the nozzle is caused by the operation of the setting regulator 22 because of the short time involved. To accommodate varying degrees of delay beyond F2 as shown the setting regulator can be adapted to progressively increase the heat applied by the heater band 10 and progressively reduce the cooling effect of the cooling band 11 dependent upon the length of time of the delay beyond K.

What is claimed is:

1. A multi-station process of forming hollow articles of thermoplastic material comprising the steps of forming a preform by injecting a quantity of plasticised material through an injection nozzle into an injection mould and blow moulding the preform to the desired hollow shape in a blow mould, each of the steps being carried out during one working cycle, establishing an optimum pre-determined constant working cycle time, sensing the beginning of a working cycle, sensing the end of a working cycle as determined by the ejection of a blow moulded article from the blow mould, comparing the elapsed time for a working cycle with the pre-determined constant cycle time, and beginning a subsequent working cycle at the end of the longest time.

2. A process according to claim 1 comprising sensing when the pre-determined cycle time is exceeded by the elapsed time and applying heat to the injection nozzle.

3. A process according to claim 2 in which the preform is cooled by cooling the injection mould, the rate of cooling being reduced when the pre-determined cycle time is exceeded by the elapsed time.

4. A process according to claim 3 in which the heat applied to the injection nozzle and the reduction in the rate of cooling of the injection mould is proportional to the difference between the elapsed time and the pre-determined time.

* * * * *